US008428126B2

(12) United States Patent
Tanaka

(10) Patent No.: US 8,428,126 B2
(45) Date of Patent: Apr. 23, 2013

(54) IMAGE DECODING DEVICE WITH PARALLEL PROCESSORS

(75) Inventor: Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1667 days.

(21) Appl. No.: 11/632,548

(22) PCT Filed: Jul. 4, 2005

(86) PCT No.: PCT/JP2005/012310
§ 371 (c)(1),
(2), (4) Date: Jan. 17, 2007

(87) PCT Pub. No.: WO2006/013690
PCT Pub. Date: Feb. 9, 2006

(65) Prior Publication Data
US 2007/0206675 A1    Sep. 6, 2007

(30) Foreign Application Priority Data

Aug. 4, 2004  (JP) .................................. 2004-228433

(51) Int. Cl.
*H04N 7/12*    (2006.01)

(52) U.S. Cl.
USPC .................................................. 375/240.12

(58) Field of Classification Search ............. 375/240.01, 375/240.12; *H04N 7/12*
See application file for complete search history.

(56) References Cited

U.S. PATENT DOCUMENTS

| 6,212,236 | B1 | 4/2001 | Nishida et al. | |
| 6,310,921 | B1 | 10/2001 | Yoshioka et al. | |
| 6,320,909 | B1 * | 11/2001 | Takabatake et al. | 375/240.25 |
| 7,079,583 | B2 * | 7/2006 | Yoshioka et al. | 375/240.26 |

FOREIGN PATENT DOCUMENTS

| EP | 0 523 878 | 1/1993 |
| JP | 07-240844 | 9/1995 |
| JP | 07-336689 | 12/1995 |
| JP | 09-037249 | 2/1997 |
| JP | 10-327412 | 12/1998 |
| JP | 10-341422 | 12/1998 |
| JP | 11-252549 | 9/1999 |

OTHER PUBLICATIONS

ISO/IEC 14496-10:2003(E), pp. 204-211.
Extended European Search Report issued Jan. 6, 2012 in corresponding European Application No. 05 76 5215.8.
Dongxiao, Li et al., "A Bus Arbitration Scheme for HDTV Decoder SoC," Circuits and Systems 2002; APCCAS '02; 2002 Asia-Pacific Conference on Oct. 28-31, 2002, Piscataway, NJ, USA; IEEE, vol. 2, Oct. 28, 2002, pp. 79-83, XP01062786, ISBN: 978-0-7803-7690-8.
Nien-Tsu Wang, "Processing and Storage Models for MPEG-2 Main Level and High Level Video Decoding—A Block-Level Pipeline Approach," PhD Thesis, pp. 40-118, Santa Clara University, Department of Computer Engineering, Jan. 26, 2004, XP002666006.

* cited by examiner

*Primary Examiner* — David Czekaj
*Assistant Examiner* — Tracy Li
(74) *Attorney, Agent, or Firm* — Wenderoth, Lind & Ponack, L.L.P.

(57) ABSTRACT

A video decoding device that performs decoding processing on blocks of a compressed video, the decoding processing including motion compensation processing for any blocks compressed based on one or more reference pictures, the device comprising: a memory that stores reference pictures; a compensation unit including an input buffer for storing one or more of the reference pictures and sequentially motion compensates block by block with reference to the stored reference pictures; a reference picture transfer unit reads, for one block in each time slot, all of the reference pictures corresponding to the one block, and write the read reference pictures to the input buffer; a judgment unit judges whether a total amount of the reference pictures read in each time slot is more than a predetermined amount; and a suppression unit suppresses, in a time slot for which the judgment unit judges affirmatively, access to the memory except read access.

5 Claims, 13 Drawing Sheets

FIG.5

| | TS=n | TS=n+1 | TS=n+2 | TS=n+3 | TS=n+4 | TS=n+5 |
|---|---|---|---|---|---|---|
| STREAM TRANSFER PROCESSING | MB #n | MB #n+1 | MB #n+2 | MB #n+3 | MB #n+4 | MB #n+5 |
| VARIABLE-LENGTH DECODING PROCESSING (VLD) | MB #n−1 | MB #n | MB #n+1 | MB #n+2 | MB #n+3 | MB #n+4 |
| INVERSE FREQUENCY CONVERSION PROCESSING | MB##n−2 | MB##n−1 | MB##n | MB##n+1 | MB##n+2 | MB##n+3 |
| REFERENCE PICTURE TRANSFER PROCESSING | MB##n−2 | MB##n−1 | MB##n | MB##n+1 | MB##n+2 | MB##n+3 |
| MOTION COMPENSATION PROCESSING / INTRA PROCESSING | MB #n−3 | MB #n−2 | MB #n−1 | MB #n | MB #n+1 | MB #n+2 |
| DEBLOCKING FILTER PROCESSING | MB #n−4 | MB #n−3 | MB #n−2 | MB #n−1 | MB #n | MB #n+1 |
| DECODED VIDEO TRANSFER PROCESSING | MB #n−5 | MB #n−4 | | MB##n−3 MB##n−2 | | MB##n−1 MB##n |

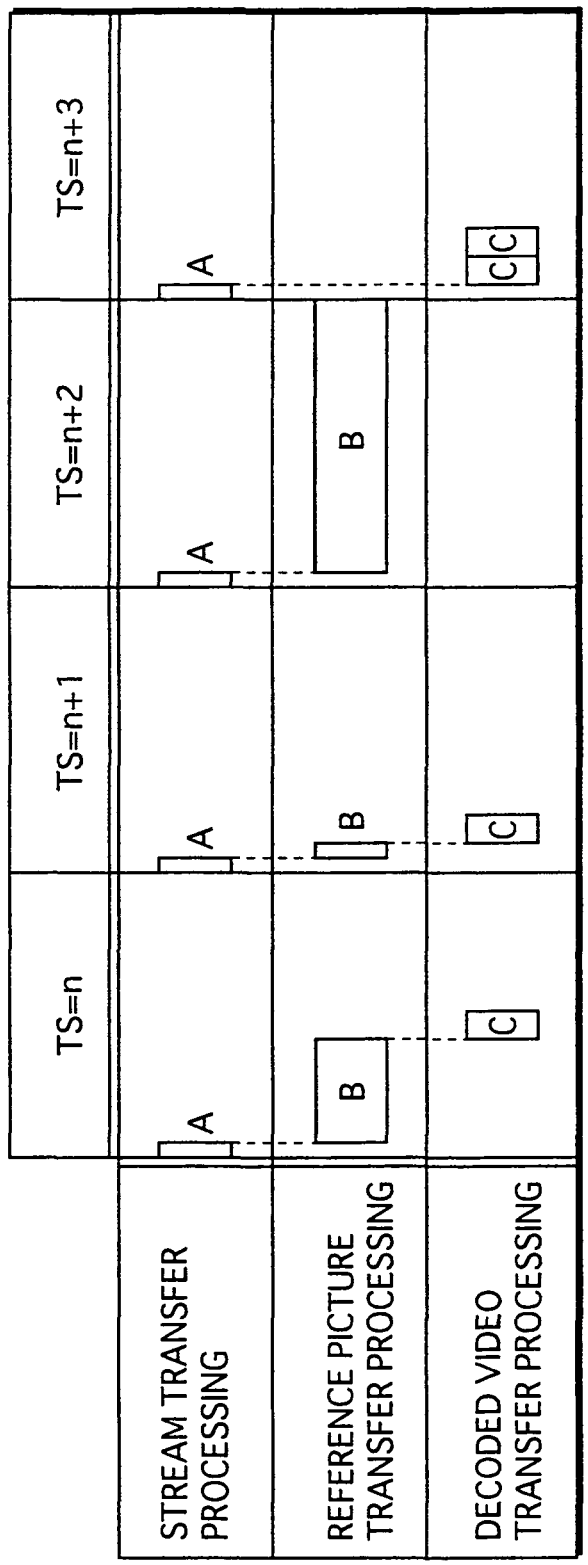

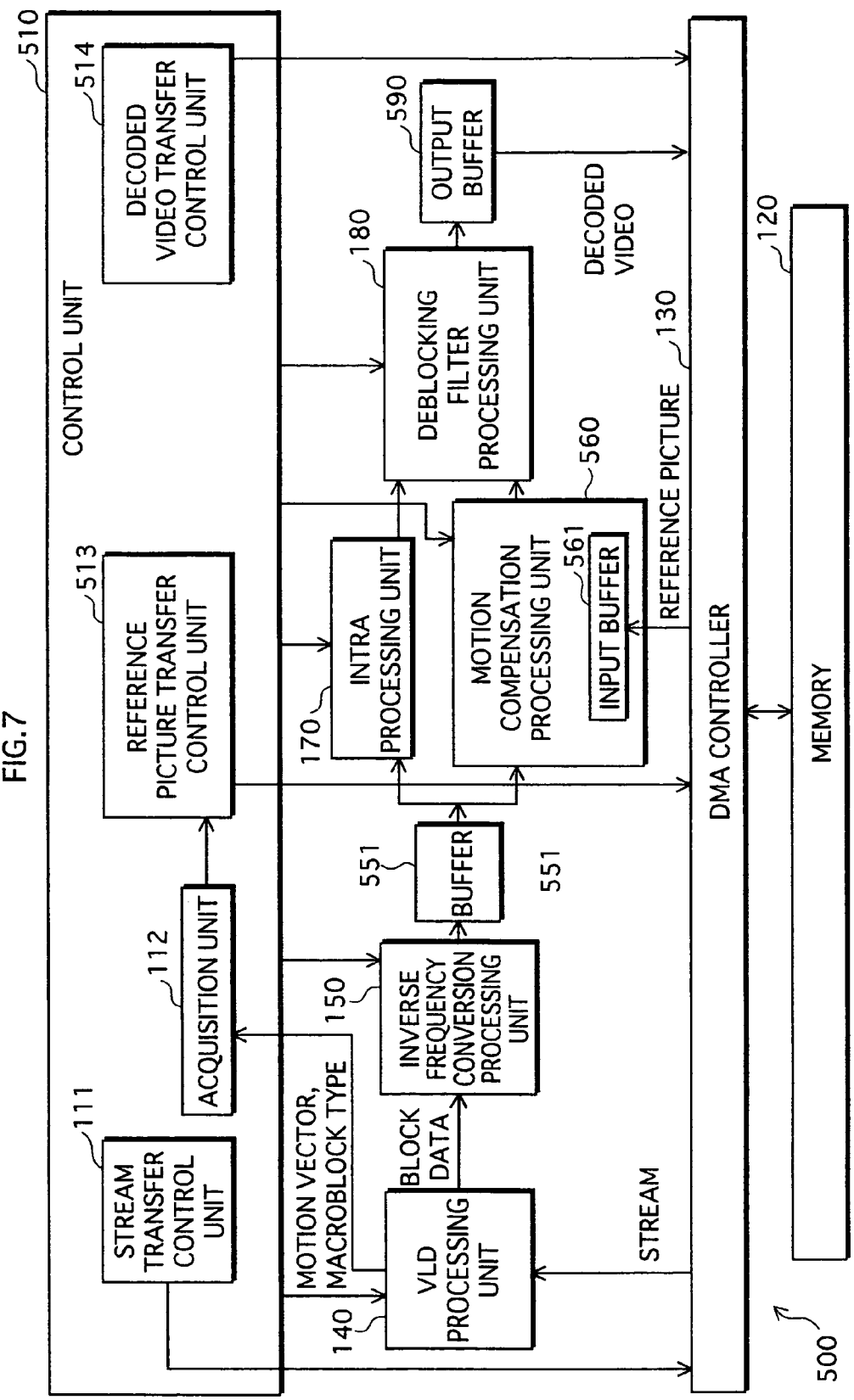

FIG.9

| | TS=n | TS=n+1 | TS=n+2 | TS=n+3 | TS=n+4 | TS=n+5 | TS=n+6 |
|---|---|---|---|---|---|---|---|
| STREAM TRANSFER PROCESSING | MB #n | MB #n+1 | MB #n+2 | MB #n+3 | MB #n+4 | MB #n+5 | MB #n+6 |
| VARIABLE-LENGTH DECODING PROCESSING (VLD) | MB #n−1 | MB #n | MB #n+1 | MB #n+2 | MB #n+3 | MB #n+4 | MB #n+5 |
| INVERSE FREQUENCY CONVERSION PROCESSING | MB##n−2 | MB##n−1 | MB##n | MB##n+1 | MB##n+2 | MB##n+3 | MB##n+4 |
| REFERENCE PICTURE TRANSFER PROCESSING | MB##n−2 | MB##n−1 | MB##n | MB##n+1 | MB##n+2 | MB##n+3 | MB##n+4 |
| MOTION COMPENSATION PROCESSING / INTRA PROCESSING | MB #n−4 | MB #n−3 | MB #n−2 | MB #n−1 | MB #n | MB #n+1 | MB #n+2 |
| DEBLOCKING FILTER PROCESSING | MB #n−5 | MB #n−4 | MB #n−3 | MB #n−2 | MB #n−1 | MB #n | MB #n+1 |
| DECODED VIDEO TRANSFER PROCESSING | MB #n−6 | MB #n−5 | MB #n−4 | MB #n−3 | MB #n−2 | MB #n−1 | MB #n |

FIG.13 PRIOR ART

| | TS=n | TS=n+1 | TS=n+2 | TS=n+3 | TS=n+4 | TS=n+5 | TS=n+6 |
|---|---|---|---|---|---|---|---|
| STREAM TRANSFER PROCESSING (READING MEMORY) | MB#n | MB#n+1 | MB#n+2 | MB#n+3 | MB#n+4 | MB#n+5 | MB#n+6 |
| VARIABLE-LENGTH DECODING PROCESSING (VLD) | MB#n−1 | MB#n | MB#n+1 | MB#n+2 | MB#n+3 | MB#n+4 | MB#n+5 |
| REFERENCE PICTURE TRANSFER PROCESSING (READING MEMORY) | MB#n−2 | MB#n−1 | MB#n | MB#n+1 | MB#n+2 | MB#n+3 | MB#n+4 |
| MOTION COMPENSATION PROCESSING | MB#n−3 | MB#n−2 | MB#n−1 | MB#n | MB#n+1 | MB#n+2 | MB#n+3 |
| DECODED VIDEO TRANSFER PROCESSING (WRITING TO MEMORY) | MB#n−4 | MB#n−3 | MB#n−2 | MB#n−1 | MB#n | MB#n+1 | MB#n+2 |

IMAGE DECODING DEVICE WITH PARALLEL PROCESSORS

TECHNICAL FIELD

The present invention relates to a video decoding device for decoding compressed videos, i.e., decompressing compressed videos, and particularly to a video decoding technique suitable for decoding videos compressed in accordance with the MPEG4 AVC standard (Moving Picture Experts Group phase 4 Advanced Video Coding, IS014496-10).

BACKGROUND ART

Conventionally, in order to transmit videos or record videos on recording media, video compression techniques for compressing videos in accordance with the MPEG standard such as the MPEG2 video standard (ISO/IEC18818-2) and the MPEG4 visual standard (ISO/IEC14496-2) are known. Also, video decoding devices for decoding videos compressed in accordance with such standard are known.

In such conventional video decoding devices, a variable-length encoded stream relating to a compressed video is decoded in the following order. The stream is read out from a memory having a large capacity such as a DRAM (Dynamic Random Access Memory), and is variable-length decoded. Motion vectors and block data are extracted from the stream macroblock by macroblock. With reference to reference pictures identified by a motion vector stored in the memory, compensation processing that is inverse processing of motion detection is performed on block data macroblock by macroblock (hereinafter, the compensation processing is referred to as "motion compensation processing"). And a decoded video obtained as a result of the motion compensation processing is stored in the memory. Here, decoded videos stored in the memory are used as reference pictures when subsequent compressed videos are decoded.

Note that, in order to decode compressed videos at a high speed, pipeline control is performed in the conventional video decoding devices for operating each compositional unit in parallel to perform processing required for decoding videos macroblock by macroblock.

FIG. 13 illustrates an execution sequence of pipeline control in a conventional video decoding device. In FIG. 13, a VLD (Variable-Length Decoder) processing unit, a motion compensation processing unit, and a DMA (Direct Memory Access) controller can be operated in parallel. The DMA controller performs the following time-sharing processing in each cycle time that is a synchronizing period in the pipeline control: stream transfer processing for DMA transferring a variable-encoded stream corresponding to one macroblock from a memory to the VLD processing unit; reference picture transfer processing for DMA transferring reference pictures corresponding to one macroblock from the memory to the motion compensation processing unit; and decoded video transfer processing for DMA transferring a decoded video corresponding to one macroblock acquired by the motion compensation processing unit to the memory. Here, the cycle time is also referred to as a time slot (TS).

Under the pipeline control shown in FIG. 13, "n" is any given integer. In a time slot expressed by TS=n, i.e., in an n-th time slot, the DMA controller performs stream transfer processing corresponding to a macroblock expressed by MB #n, i.e., an n-th macroblock. In an (n+1)-th time slot, the VLD processing unit performs variable-length decoding processing corresponding to the n-th macroblock. In an (n+3)-th time slot, the motion compensation processing unit performs motion compensation processing corresponding to the n-th macroblock. In an (n+4)-th time slot, the DMA controller performs decoded video transfer processing corresponding to the n-th macroblock.

AS described above, in the conventional video decoding devices, the cycle time has been determined so as to be the maximum value of a time period required for processing macroblock by macroblock such as the reference picture transfer processing, the variable-length decoding processing, the motion compensation processing performed by each unit. Also, in the determined cycle time, the video decoding devices have needed to exhibit a required performance of decoding videos macroblock by macroblock. And the pipeline control is performed such that the compositional units perform processing in synchronization with each other in each cycle time. In other words, conventionally, in order to appropriately perform pipeline control based on a processing time period macroblock by macroblock, reference picture transfer processing, i.e., memory access for transmitting reference pictures corresponding to each macroblock to the motion compensation processing unit has been performed in one cycle time. Note that since the upper limit of the number of motion vectors corresponding to one macroblock is determined in the MPEG2 video standard and the MPEG4 visual standard, a requirement for a memory bus band width is determined by calculating an amount of the number of reference pictures corresponding to the number of the motion vectors.

In the recently determined MPEG4 AVC standard (See ISO/IEC 14496-10 Information Technology—Coding of Audio-visual Objects—Part 10: Advanced Video Coding), there is scalability that decoding targets include both QCIF (Quarter Common Intermediate Format) videos having a small size and HD (High Definition) videos having a large size. Videos are classified into a plurality of levels depending on a size of videos. In the MPEG2 video standard, the maximum value of motion vectors corresponding to one macroblock is four. Compared with this, in the MPEG4 AVC standard, the maximum value has been increased to 32. Accordingly, redundancy of videos in the time-axis can be reduced more effectively. However, there is a viewpoint that, in the level for videos having a large size such as HD videos, an amount of calculation in decoding processing for reproducing videos needs to be suppressed within a predetermined range. Accordingly, although the number of motion vectors has been increased, the upper limit of the total number of motion vectors corresponding to two macroblocks including one macroblock and one former or subsequent macroblock is determined.

SUMMARY OF THE INVENTION

The Problems the Invention is Going to Solve

In the above-mentioned conventional video decoding device, in order to decode videos compressed in accordance with the specification corresponding to a level of videos having a large size, a memory bus band width needs to be widened to transfer reference pictures whose amount is more than twice an amount transferred in the conventional video decoding devices in one cycle time. Accordingly, a memory having a large capacity for storing videos needs to operate in a higher frequency, for example. This increases manufacturing costs of video decoding devices.

The present invention is made in view of the above problem, and aims to provide a video decoding device that can decode videos compressed in accordance with the specification corresponding to the level of videos having a large size, and has a structure for suppressing a memory bus band width.

Means for Solving the Problem

In order to solve the above problem, the present invention is a video decoding device that performs decoding processing on blocks of a compressed video, the decoding processing including motion compensation processing for any blocks compressed based on one or more reference pictures, the video decoding device comprising: a memory that stores reference pictures; a compensation unit including an input buffer for storing one or more of the reference pictures and operable to sequentially perform the motion compensation processing block by block with reference to the stored reference pictures; a reference picture transfer unit operable to read, for one block in each of a plurality of time slots, all of the reference pictures corresponding to the one block from the memory, and write the read reference pictures to the input buffer; a judgment unit operable to judge whether a total amount of the reference pictures read in each time slot is more than a predetermined amount; and a suppression unit operable to suppress, in a time slot for which the judgment unit judges affirmatively, access to the memory except read access by the reference picture transfer unit.

Here, the time slot is a unit time of cycles, has a predetermined time period, and is a unit time in the pipeline control, for example.

Effect of the Invention

With the above structure, in a cycle time where a large amount of reference pictures is read from the memory, the video decoding device according to the present invention suppresses memory access except access for reading reference pictures. Therefore, the maximum amount of data transferred in the time slot can be suppressed. This can suppress a memory bus band width.

Suppose the case where the number of memories is reduced because of cost reduction. For example, if decoding videos with use of a single memory by performing compensation processing that is inverse processing of motion detection, the single memory is accessed for reading reference pictures, writing decoded videos to be used as reference pictures, and reading encoded streams of compressed videos. In the video decoding device according to the present invention, at least one of these memory accesses except the access for reading reference pictures is temporarily suppressed in a time slot.

Also, suppose that if the pipeline control is appropriately performed in the video decoding device that can perform processing separately block by block, for example macroblock by macroblock, reference pictures need to be transferred as the maximum amount of transferred data between the memory and each unit in each time slot, and also the upper limit of the number of motion vectors corresponding to two macroblocks is determined for videos having a large size compressed in accordance with the MPEG4AVC standard. In view of these, memory access temporarily suppressed in a time slot A can be performed in a next time slot B where an amount of transferred data is less than that in the time slot A. Therefore, suppression of memory accesses in a certain time slot by the video decoding device according to the present invention causes no problem.

Here, the video decoding device may further comprise: an acquisition unit operable to sequentially acquire motion vectors corresponding to one block compressed based on one or more reference pictures, wherein the compensation unit may perform the motion compensation processing on the one block based on the acquired motion vectors with reference to the reference pictures, each of the reference pictures corresponding to one block that are to be read by the reference picture transfer unit may be identified by each of the motion vectors corresponding to the one block, and the judgment unit may perform the judgment with respect to the total amount of the reference pictures corresponding to one block by judging whether a number of the motion vectors corresponding to the one block is more than a predetermined threshold value.

With the above structure, by simply comparing the acquired number of the motion vectors with the predetermined threshold value, whether the total amount of the reference pictures is more than the predetermined amount can be judged.

Also, the video decoding may further comprise: an output buffer operable to store decoded videos corresponding to motion compensated blocks; and a decoded video transfer unit operable to sequentially read the decoded videos block by block from the output buffer, and write the read decoded videos to the memory, wherein in a time slot for which the judgment unit may judge affirmatively, the suppression unit suppresses access to the memory by the decoded video transfer unit.

With the above structure, by setting, as a suppression target, memory access for writing decoded videos that do not necessarily need to be immediately written to the memory macroblock by macroblock, the memory bus band width can be comparatively easily suppressed with no necessity for changing relations among processing time periods of the units that decodes compressed videos, such as the VLD processing unit and the motion compensation processing unit.

Also, the output buffer may have a capacity for storing decoded videos corresponding to two motion compensated blocks, in a time slot subsequent to the time slot for which the judgment unit judges affirmatively, the decoded video transfer unit may read decoded videos corresponding to two consecutive motion compensated blocks from the output buffer, and write the read decoded videos to the memory, and in a time slot except the subsequent time slot, the decoded video transfer unit may read a decoded video corresponding to one motion compensated block from the output buffer, and write the read decoded video to the memory.

With the above structure, writing decoded videos suppressed in a certain time slot is performed in a next time slot where an amount of transferred data of reference pictures is relatively less. This enables decoding videos with hardly increasing time periods required for decoding videos frame by frame.

Also, the memory may further store encoded streams obtained by variable-length encoding data that includes block data and block header information for each block, the block header information including motion vectors and information showing whether one block is compressed based one or more reference pictures, the video decoding device may further comprise: a variable-length decoding unit operable to sequentially variable-length decode input encoded streams; a stream transfer unit operable to sequentially read the encoded streams from the memory, and sequentially input the read encoded streams to the variable-length decoding unit; and an intra processing unit operable to sequentially decode the block data with reference to no reference picture, wherein the acquisition unit may acquire the motion vectors included in the variable-length decoded stream, transmit block data of a block compressed based on one or more reference pictures to the compensation unit, and transmit block data of a block compressed based on no reference picture to the intra processing unit, and the output buffer may further store decoded videos corresponding to the block decoded by the intra processing unit.

Also, the memory may further store encoded streams obtained by variable-length encoding data that includes block data and block header information for each block, the block header information including motion vectors and information showing whether one block is compressed based on one or more reference pictures, the video decoding device may further comprise: a stream transfer unit operable to sequentially read the encoded streams from the memory, and sequentially input the read encoded streams to the variable-length decoding unit; a variable-length decoding unit operable to sequentially variable-length decode the input encoded streams; and an intra processing unit operable to sequentially decode the block data with reference to no reference picture, wherein the acquisition unit may acquire the motion vectors included in the variable-length decoded stream, transmit block data of a block compressed based on one or more reference pictures to the compensation unit, and transmit block data of a block compressed based on no reference picture to the intra processing unit, and in a time slot for which the judgment unit judges affirmatively, the suppression unit may suppress the access to the memory by the stream transfer unit.

With the above structure, a suppression target is memory access for transferring encoded streams whose amount of transferred data between the memory and the DMA controller per unit time period is less than that of reference pictures. Therefore, even if transfer of an encoded stream suppressed in a certain time slot is performed in a next time slot, the memory bus band width does not need to be widened. This can suppress the memory bus band width.

Also, a video decoding device according to the present invention is a video decoding device that performs decoding processing on blocks of a compressed video, the decoding processing including motion compensation processing for any blocks compressed based on one or more reference pictures, the video decoding device comprising: a memory that stores reference pictures; a compensation unit including an input buffer for storing one or more of the reference pictures and operable to sequentially perform the motion compensation processing block by block with reference to the stored reference pictures, the input buffer having a capacity that sufficiently stores reference pictures corresponding to two blocks; and a reference picture transfer unit operable to read, for two blocks in two consecutive time slots, all of the reference pictures respectively corresponding to the two blocks from the memory, and write the read reference pictures to the input buffer.

With the above structure, the memory bus band width does not need to be determined for transferring the maximum amount of transferred data of reference pictures corresponding to one macroblock in one time slot. This needs less requirement for the memory bus bandwidth.

Here, the video decoding device may further comprise a processing unit operable to perform processing on decoded videos motion compensated by the compensation processing unit, wherein in parallel with the transfer performed by the reference picture transfer unit, one of the processing unit and the compensation unit may perform processing for one block in each of plurality of time slots, and for a block whose transfer starts in a certain time slot, one of the processing unit and the compensation unit may start performing the processing in a time slot after a next time slot of the certain time slot.

With the above structure, processing depending on reference pictures corresponding to each macroblock can be performed at an appropriate time.

Also, a video decoding method according to the present invention is a video decoding method that performs decoding processing on blocks of a compressed video stored in a memory together with reference pictures, the decoding processing including motion compensation processing for any blocks compressed based on one or more of the reference pictures, the video decoding method comprising: a reference picture transferring step for reading, for one block in each of a plurality of time slots, all of the reference pictures corresponding to the one block from the memory, and writing the read reference pictures to a predetermined buffer; a judging step for judging whether a total amount of the reference pictures read in each time slot is more than a predetermined amount; a suppressing step for suppressing, in a time slot for which the judgment step judges affirmatively, access to the memory except read access by the reference picture transfer step; and a compensating step for sequentially performing the motion compensation block by block with reference to the stored reference pictures.

With the above structure, in a time slot where an amount of reference pictures read from the memory is greater, the maximum amount of transferred data can be suppressed in the time slot in the pipeline control according to decoding compressed videos. This can suppress the memory bus bandwidth.

Also, a video decoding method according to the present invention is a video decoding method that performs decoding processing on blocks of a compressed video stored in a memory together with reference pictures, the decoding processing including motion compensation processing for any blocks compressed based on one or more of the reference pictures, the video decoding method performing in parallel: a reference picture transferring step for reading, for two blocks in two consecutive time slots, all of the reference pictures respectively corresponding to the two blocks from the memory, and writing the read reference pictures to a predetermined buffer; and a compensation step for sequentially performing the motion compensation processing block by block with reference to the written reference pictures.

With the above structure, if compressed videos are decoded by performing the pipeline control for performing processing where each pipeline stage corresponds to one macroblock in basically one time slot, transfer of reference pictures is not restricted to be completed in one time slot. Therefore, the memory bus band width does not need to be determined for transferring the maximum amount of transferred data of reference pictures corresponding to one macroblock in one time slot. This needs less requirement for the memory bus bandwidth.

Also, a semiconductor integrated circuit according to the present invention is a semiconductor integrated circuit that performs decoding processing on blocks of a compressed video, the decoding processing including motion compensation processing for any blocks compressed based on one or more reference pictures, the semiconductor integrated circuit comprising: a memory that stores reference pictures; a compensation circuit unit including an input buffer for storing one or more of the reference pictures and operable to sequentially perform the motion compensation processing block by block with reference to the stored reference pictures; a reference picture transfer circuit unit operable to read, for one block in each of a plurality of time slots, all of the reference pictures corresponding to the one block from the memory, and write the read reference pictures to the input buffer; a judgment circuit unit operable to judge whether a total amount of the reference pictures read in each time slot is more than a predetermined amount; and a suppression circuit unit operable to suppress, in a time slot for which the judgment circuit unit judges affirmatively, access to the memory except read access by the reference picture transfer circuit unit.

In the semiconductor integrated circuit, memory accesses except the access for reading reference pictures is suppressed, the maximum amount of transferred data can be suppressed in the time slot. Therefore, this can suppress the memory bus band width.

Also, a semiconductor integrated circuit according to the present invention is a semiconductor integrated circuit that performs decoding processing on blocks of a compressed video, the decoding processing including motion compensation processing for any blocks compressed based on one or more reference pictures, the semiconductor integrated circuit comprising: a memory that stores reference pictures; a compensation circuit unit including an input buffer for storing one or more of the reference pictures and operable to sequentially perform the motion compensation processing block by block with reference to the stored reference pictures, the input buffer having a capacity that sufficiently stores reference pictures corresponding to two blocks; and a reference picture transfer circuit unit operable to read, for two blocks in two consecutive time slots, all of the reference pictures respectively corresponding to the two blocks from the memory, and write the read reference pictures to the input buffer.

In the semiconductor integrated circuit, the memory bus band width does not need to be determined for transferring the maximum amount of transferred data of reference pictures corresponding to one macroblock in one time slot. This needs less requirement for the memory bus bandwidth.

BRIEF DESCRIPTION OF THE DRAWINGS

FIG. 5 shows an execution sequence of pipeline control performed by the control unit 110;

FIG. 6 shows control of DMA transfer in the video decoding device 100;

FIG. 7 is a block diagram of a video decoding device 500 according to a second embodiment of the present invention;

FIG. 9 shows an execution sequence of pipeline control performed by the control unit 510;

FIG. 13 illustrates an execution sequence of pipeline control in a conventional video decoding device.

Figure 1:
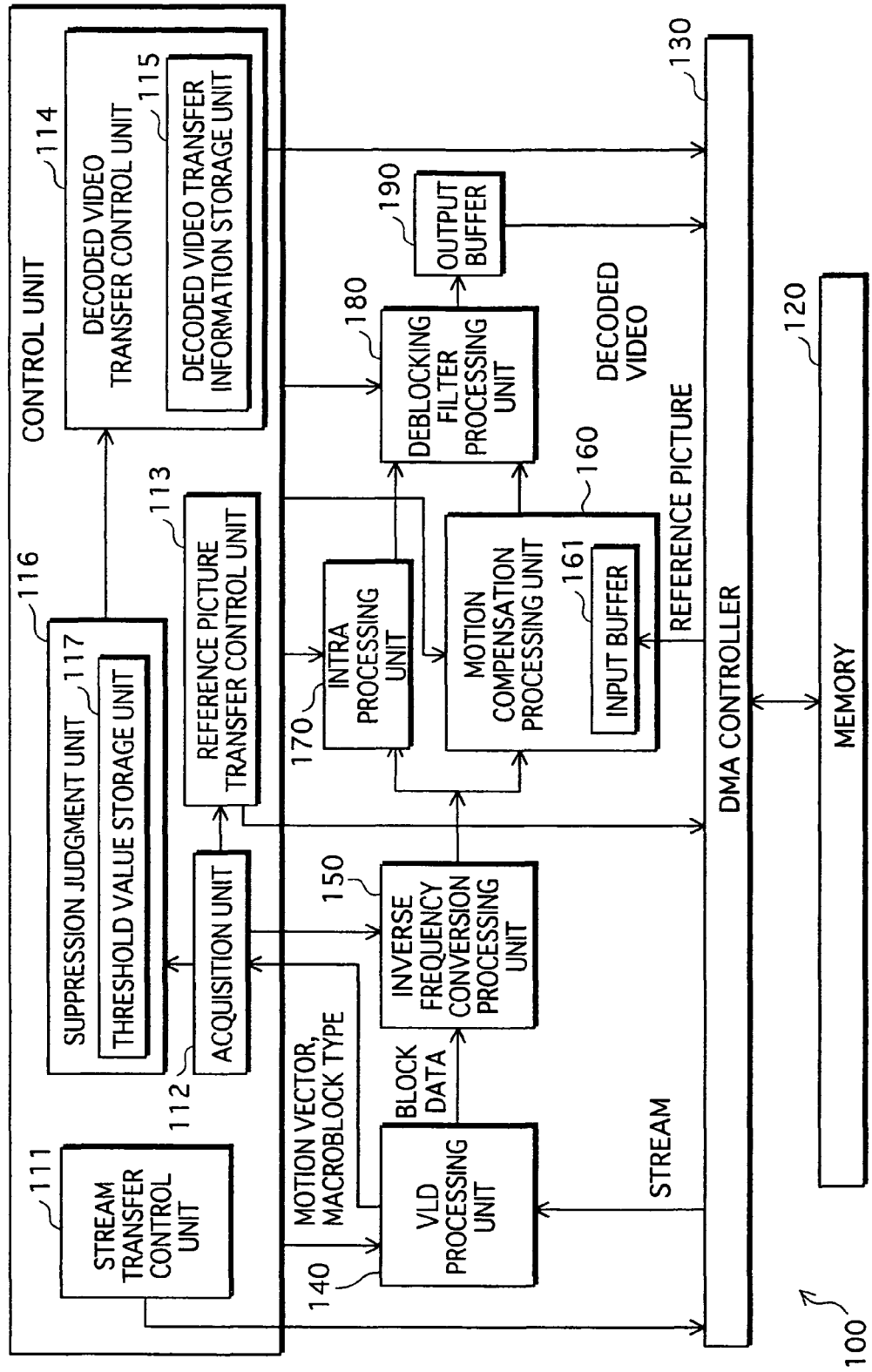
FIG. 1 is a block diagram showing a video decoding device 100 according to a first embodiment of the present invention.

DESCRIPTION OF CHARACTERS 100 and 500: video decoding device
110 and 510: control unit
111: stream transfer control unit
112: acquisition unit
113 and 513: reference picture transfer control unit
114 and 514: decoded video transfer control unit
115: decoded video transfer information storage unit
116: suppression judgment unit
117: threshold value storage unit
120: memory
130: DMA controller
140: VLD processing unit
150: inverse frequency conversion processing unit
160 and 560: motion compensation processing unit
161 and 561: input buffer
170: intra processing unit
180: deblocking filter processing unit
190 and 590: output buffer
551: buffer

DETAILED DESCRIPTION OF THE INVENTION

First Embodiment

The following describes a video decoding device 100 according to a first embodiment of the present invention.
<Structure>

FIG. 1 is a block diagram showing the video decoding device 100 according to the first embodiment of the present invention.

As shown in FIG. 1, the video decoding device 100 includes a control unit 110, a memory 120, a DMA controller 130, a VLD processing unit 140, an inverse frequency conversion processing unit 150, a motion compensation-processing unit 160, an intra processing unit 170, a deblocking filter processing unit 180, and an output buffer 190.

Here, the memory 120 is a DRAM that stores encoded streams obtained by variable-length encoding compressed videos, etc., and is for storing reference pictures. Note here that the word "video" is used as a concept including the word "video data" representing a content of a video to be displayed.

The DMA controller 130 includes a cue that receives an instruction including a specification of a memory address and the like from the control unit 110. In accordance with the received instruction, the DMA controller 130 performs data transfer between the memory 120 and each of the VLD processing unit 140, the motion compensation processing unit 160, and the output buffer 190.

Figure 2:
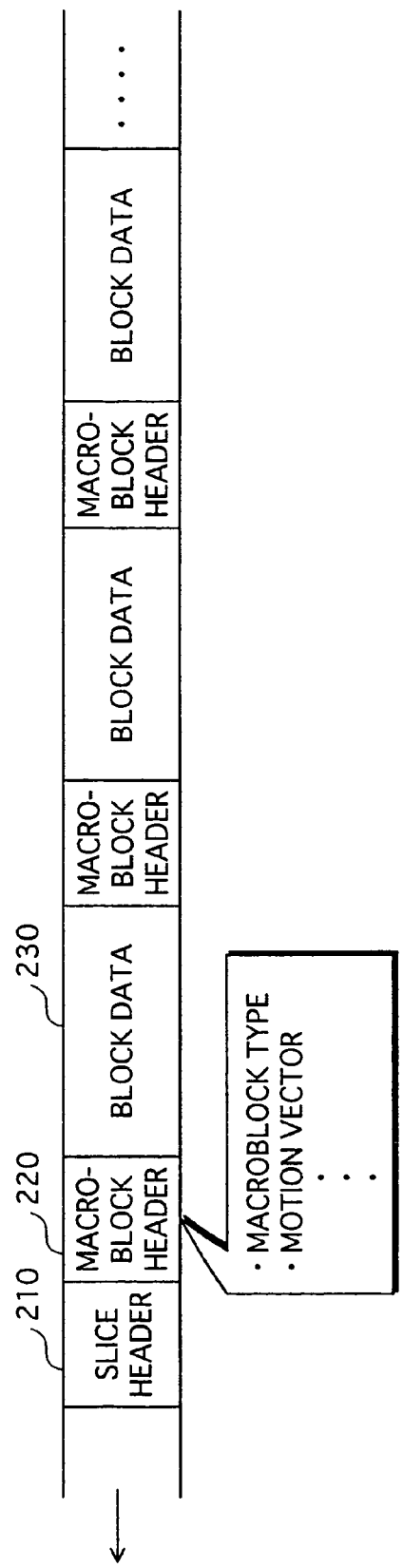
FIG. 2 shows a structure of stream data of a compressed video.

Upon reception of an input of an encoded stream obtained by variable-length encoding stream data of a compressed video, the VLD processing unit 140 variable-length decodes the encoded stream, extracts a macroblock type and a motion vector from the stream data of the compressed video, and transmits the extracted macroblock type and motion vector to the control unit 110. Also, the VLD processing unit 140 extracts frequency-converted block data that is an entity of a macroblock and represents difference values, and transmits the extracted frequency-converted block data to the inverse frequency conversion processing unit 150. In addition, as shown by the data structure in FIG. 2, the stream data of the compressed video is structured with a sequence of: a slice header 210 that shows a picture type such as an I-picture, a P-picture, and a B-picture; and a plurality of sets of a macroblock header 220 and a piece of block data 230 macroblock by macroblock. Each of the macroblock headers 220 includes a motion vector and a macroblock type. The macroblock type shows whether a macroblock is an inter macroblock compressed in an inter mode based on one or more reference pictures, or an intra macroblock compressed in an intra mode based on no reference picture.

The inverse frequency conversion processing unit 150 inverse frequency converts the block data transmitted from the VLD processing unit 140 to acquire difference values, and outputs the difference values.

The motion compensation processing unit 160 includes an input buffer 161, and performs compensation processing for reconstructing a video by adding a picture having a quarter-pel accuracy calculated among the reference pictures stored in the input buffer 161 and the difference values of the macroblock output by the inverse frequency conversion processing unit 150. This compensation processing that is inverse processing of motion detection is referred to as "motion compensation processing" here.

The intra processing unit 170 performs intra processing. That is, the intra processing unit 170 adds each difference value of a macroblock output by the inverse frequency conversion processing unit 150 and values of peripheral pictures of the macroblock to reconstruct a video.

The deblocking filter processing unit 180 performs deblocking filter processing on the reconstructed video output by the motion compensation processing unit 160 or the intra processing unit 170. That is, the deblocking filter processing unit 180 acquires a decoded video by performing deblocking filter for suppressing a block noise of the reconstructed video, and transmits the acquired decoded video to the output buffer 190.

The output buffer 190 is a buffer memory having a sufficient capacity for storing decoded videos corresponding to two macroblocks.

Moreover, the control unit 110 has a hardware structure including a processor, a ROM (Read Only Memory), a timer, etc. The processor operating a program stored in the ROM realizes pipeline control for causing each unit of the video decoding device 100 to perform each processing relating to video decoding processing on a macroblock-by-macroblock basis in parallel in each of a plurality predetermined cycle times. Specifically, the control unit 110 controls the DMA controller 130, the VLD processing unit 140, the inverse frequency conversion processing unit 150, the motion compensation processing unit 160, the intra processing unit 170, and the deblocking filter processing unit 180. Also, the control unit 110 includes, as functional compositional elements, a stream transfer control unit 111, an acquisition unit 112, a reference picture transfer control unit 113, a decoded video transfer control unit 114, and a suppression judgment unit 116.

Here, the stream transfer control unit 111 instructs the DMA controller 130 to transfer an encoded stream from the memory 120 to the VLD processing unit 140.

The acquisition unit 112 acquires motion vectors and a macroblock type of a macroblock from the VLD processing unit 140, transmits the acquired motion vectors and macroblock type to the reference picture transfer control unit 113, and also counts the number of the motion vectors, and transmits the number of the motion vectors to the suppression judgment unit 116.

If the macroblock is an inter macroblock, the reference picture transfer control unit 113 identifies each position of reference pictures based on each of the motion vectors, and instructs the DMA controller 130 to transfer all of the reference pictures corresponding to the macroblock from the memory 120 to the input buffer 161 of the motion compensation processing unit 160 in each cycle time.

The decoded video transfer control unit 114 includes a decoded video transfer information storage unit 115 that stores information showing whether a decoded video has been transmitted from the output buffer 190 to the memory 120 within one cycle time. Also, the decoded video transfer control unit 114 instructs the DMA controller 130 to transfer decoded videos in the output buffer 190 to the memory 120.

The suppression judgment unit 116 includes a threshold value storage unit 117 that prestores a threshold value of the number of motion vectors. The suppression judgment unit 116 compares the number of motion vectors transmitted by the acquisition unit 112 with the threshold value thereof to judge whether the number of the motion vectors is more than the threshold value, and prevents the decoded video transfer control unit 114 from instructing transfer of the decoded video to the memory 120 depending on the result of the judgment. Note that the suppression judgment unit 116 indirectly judges whether an amount of transferred data of reference pictures corresponding to the motion vector is more than a predetermined amount by judging whether the number of the motion vectors is more than the threshold value. If an amount of transferred data of reference pictures in a cycle time is more than the predetermined amount, the suppression judgment unit 116 prevents the decoded video transfer control unit 114 from instructing writing of the decoded video to the memory 120 in the cycle time.

Figure 3:
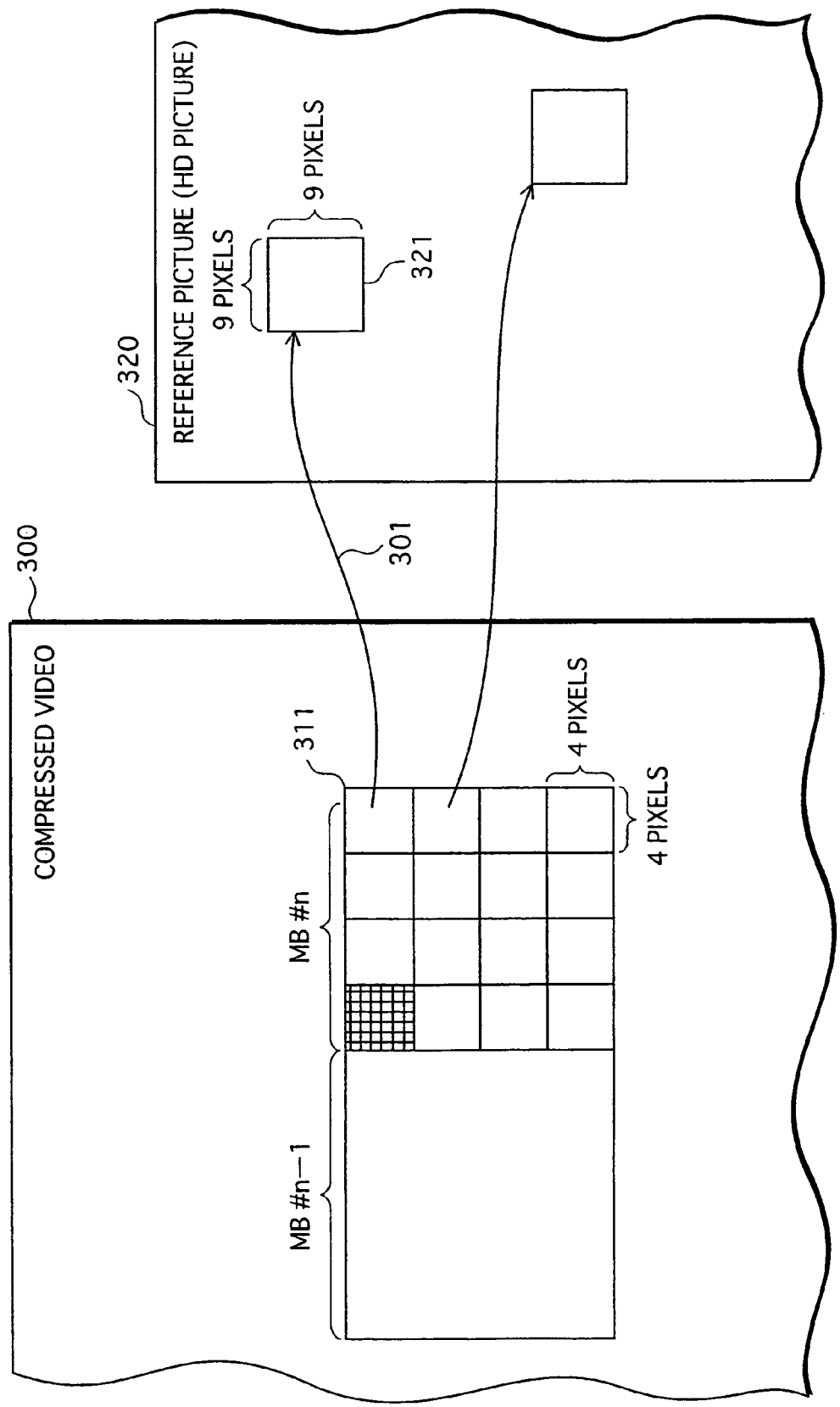
FIG. 3 shows a correspondence between a macroblock and a reference picture.

FIG. 3 shows a correspondence between a macroblock and a reference picture.

A plurality of macroblocks obtained by partitioning a compressed video 300 each consists of luminance signals and color-difference signals. In FIG. 3, the luminance signals are shown. One macroblock consists of luminance signals of 16×16 pixels. If a macroblock 311 is similar to a reference picture 321 included in a reference picture 320 that is a picture frame and exists in a time different from the compressed video 300, a motion vector 301 shows a difference between a spatial position of the macroblock 311 and a spatial position of the reference picture 321. In addition, the reference picture 320 is a group of partial reference pictures such as the reference picture 321.

Note that the threshold value storage unit 117 stores a threshold value "S" that is a smallest integer among integers that satisfy the following formula.

$$f(S) \geq f(V-S)+C$$

Here, a function "f(x)" is a function that shows a total amount of bits of reference pictures in the case where the number of motion vectors is "x". "V" is an upper limit of the number of motion vectors corresponding to two consecutive macroblocks. "C" is a total amount of bits of a decoded video corresponding to one macroblock.

Accordingly, by performing judgment based on the threshold value "S", whether an amount of reference pictures that are to be DMA transferred is more than the predetermined amount that is no less than $f(V-S)+C$.

<Operations>

The following describes the operations for decoding videos on a macroblock-by-macroblock basis performed by the video decoding device 100, in accordance with the flow of control performed by the control unit 110.

The control unit 110 sequentially determines a decoding target macroblock among macroblocks that constitute a compressed video, and performs pipeline control to cause each unit of the video decoding device 100 to sequentially perform processing on any of six macroblocks in each cycle time. Here, processing performed on one macroblock is described.

Figure 4:
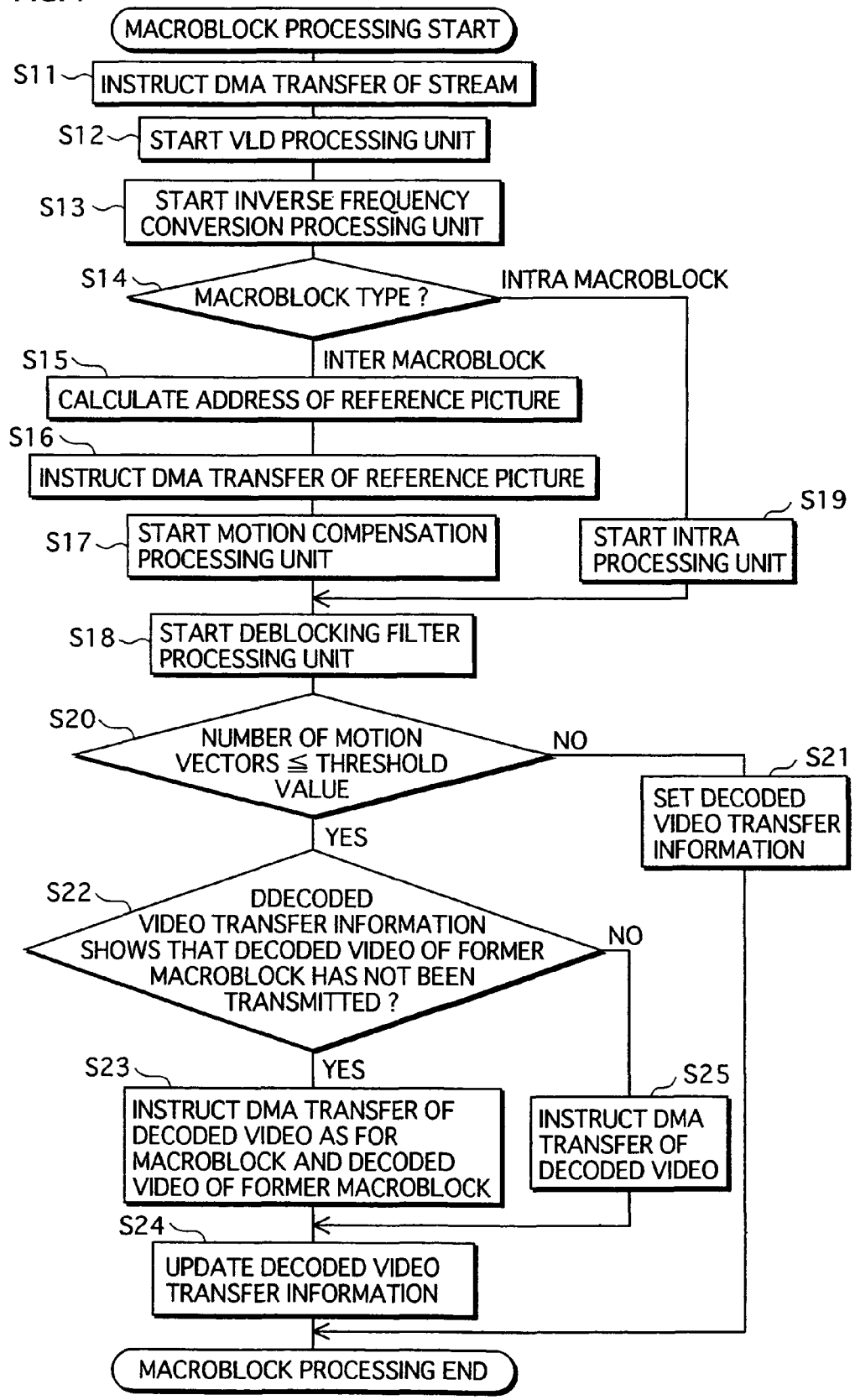
FIG. 4 is a flow chart showing decoding control performed on a macroblock by a control unit 110.

FIG. 4 is a flow chart showing decoding control performed on a macroblock by the control unit 110.

Firstly, the stream transfer control unit 111 of the control unit 110 instructs the DMA controller 130 to transfer an encoded stream from the memory 120 to the VLD processing unit 140 (Step S11). The DMA controller 130 receives the instruction by the cue, and transfers an encoded stream corresponding to one macroblock.

The control unit 110 starts up the VLD processing unit 140 (Step S12). The VLD processing unit 140 extracts motion vectors and a macroblock type from the encoded stream, and transmits the extracted motion vectors and macroblock type to the acquisition unit 112. Also, the VLD processing unit 140 extracts block data from the encoded stream, and transmits the extracted block data to the inverse frequency conversion processing unit 150.

The control unit 110 starts up the inverse frequency conversion processing unit 150 (Step S13). The inverse frequency conversion processing unit 150 inverse frequency converts the block data, and outputs the inverse frequency converted block data.

Regarding a macroblock type of the macroblock, the control unit 110 judges whether the macroblock is an inter macroblock or an intra macroblock (Step S14). If the macroblock is an inter macroblock, the acquisition unit 112 of the control unit 110 transmits the motion vectors to the reference picture transfer control unit 113. Based on a position of the macroblock and the motion vectors, the reference picture transfer control unit 113 calculates each position of reference pictures to calculate each address of the reference pictures in the memory 120 (Step S15). The reference picture transfer control unit 113 instructs the DMA controller 130 to transfer the reference pictures from the memory 120 to the input buffer 161 with specification of the address (Step S16). Then, the reference picture transfer control unit 113 starts up the motion compensation processing unit 160 (Step S17), and starts up the deblocking filter processing unit 180 (Step S18). The DMA controller 130 receives the instruction in Step S16 by the cue, and transfers all of the reference pictures corresponding to the macroblock to the input buffer 161.

Also, based on the reference pictures stored in the input buffer 161 and the inverse frequency converted block data, the motion compensation processing unit 160 reconstructs a video, and transmits the reconstructed video to the deblocking filter processing unit 180. Also, the deblocking filter processing unit 180 suppresses a block noise of the reconstructed video, and stores the reconstructed video in the output buffer 190.

On the other hand, if the macroblock is an intra macroblock in Step S14, the control unit 110 skips the operations in Steps S15 to S17, starts up the intra processing unit 170 (Step S19), and starts up the deblocking filter processing unit 180 (Step S18). The intra processing unit 170 reconstructs a video based on the inverse frequency converted block data, and transmits the reconstructed video to the deblocking filter processing unit 180.

Moreover, the suppression judgment unit 116 of the control unit 110 compares the number of the motion vectors acquired by the acquisition unit 112 and the threshold value "S" stored in the threshold value storage unit 117. If the number of the motion vectors is more than the threshold value "S" (Step S20: N), the suppression judgment unit 116 prevents the decoded video transfer control unit 114 from instructing DMA transfer of the decoded video to the memory 120, and then updates the decoded video transfer information stored in the decoded video transfer information storage unit 115 so as to show that the decoded video has not been transferred to the memory 120 (Step S21). On the other hand, if the number of the motion vectors is no more than the threshold value "S" (Step S20: Y), the decoded video transfer control unit 114 judges, with reference to the decoded video transfer information, whether a decoded video corresponding to a macroblock one macroblock before has been transmitted to the memory 120 (Step S22). If the decoded video has not been transmitted, the decoded video transfer control unit 114 instructs the DMA controller 130 to transfer decoded videos corresponding to two macroblocks, i.e., a decoded video corresponding to a current macroblock and the decoded video corresponding to the former macroblock, from the output buffer 190 to the memory 120 (Step S23). And then, the decoded video transfer control unit 114 clears the decoded video transfer information, that is, updates the decoded video transfer information so as to show that there exists no decoded video that has not been transferred yet (Step S24). If the decoded video for the former macroblock has been transferred, the decoded video transfer control unit 114 instructs the DMA controller 130 to transfer a decoded video corresponding to a certain macroblock from the output buffer 190 to the memory 120 (Step S25), and clears the decoded video transfer information (Step S24).

In the operation in Step S23 or Step S25, a block noise is suppressed by the deblocking filter processing unit 180, and the decoded video stored in the output buffer 190 is DMA transferred to the memory 120.

The processing performed on one macroblock has been described step-by-step, with reference to FIG. 4. Actually, the control unit 110 performs pipeline control, and so the operations shown in each step in the flow chart of FIG. 4 are performed firstly in each cycle time, which is a cyclic time period in the pipeline control. Note that, though a processing target macroblock is different in each step, the following operations may be performed in any order as long as firstly performed in each cycle time: Step S11, Step S12, Step S13, Step S15 and Step S16, Step S17 or Step S19, Step S18, and Steps S20 to S25.

Also, the control unit 110 starts up each unit in order to transmit a start of a cycle to the unit, and the unit performs processing on basically one macroblock within each cycle time.

FIG. 5 shows an execution sequence of the pipeline control performed by the control unit 110.

In FIG. 5, a time slot TS=n (n is any given integer) indicates an n-th cycle time. Moreover, MB #n indicates that an n-th macroblock is a processing target.

As shown in FIG. 5, under the pipeline control performed by the control unit 110, the following processing are performed in parallel: stream transfer processing performed by the DMA controller 130 in accordance with instructions by the stream transfer control unit 111; variable-length decoding processing performed by the VLD processing unit 140; inverse frequency conversion processing performed by the inverse frequency conversion processing unit 150; reference picture transfer processing performed by the DMA controller 130 in accordance with instructions by the reference picture transfer control unit 113; motion compensation processing performed by the motion compensation processing unit 160 or intra processing performed by the intra processing unit 170; deblocking filter processing performed by the deblocking filter processing unit 180; and decoded video transfer processing performed by the DMA controller 130 in accordance with instructions by the decoded video transfer control unit 114.

Therefore, within a certain cycle time, the above-described units perform processing on six macroblocks in parallel. A length of the cycle time is determined so as to satisfy a speed required for video decoding processing. Each unit needs to perform processing such that a longest time period required for processing on a macroblock-macroblock basis performed by any one among the units is within a time period equivalent to one cycle time.

FIG. 5 shows an example of decoded video transfer processing. In this example, the following is supposed: within a cycle time expressed by TS=(n+2), the number of motion vectors corresponding to the n-th macroblock that is a target of the reference picture transfer processing is more than the threshold value "S"; and within a cycle time expressed by TS=(n+4), the number of motion vectors corresponding to the (n+2)-th macroblock that is a target of the reference picture transfer processing is more than the threshold value "S".

Accordingly, within the cycle time expressed by TS=(n+2), an amount of data transferred in the reference picture transfer processing is more than a predetermined amount, and therefore decoded video transfer processing for an (n−3)-th macroblock is suppressed under the control shown in the above-described Steps S20 to S25. As a result, within a cycle time expressed by TS=(n+3), decoded video transfer processing for both the (n−3)-th macroblock and an (n−2)-nd macroblock is performed. Also, within a cycle time expressed by TS=(n+4), an amount of data transferred in the reference picture transfer processing is more than the predetermined amount, and therefore decoded video transfer processing for an (n−1)-nd macroblock is inhibited. As a result, within a cycle time expressed by TS=(n+5), decoded video transfer processing as for both the (n−1)-nd macroblock and an n-th macroblock is performed.

FIG. 6 shows DMA transfer control in the video decoding device 100.

The DMA controller 130 performs the following time-sharing processing within each cycle time: stream transfer processing for DMA transferring variable-length encoded streams corresponding to one macroblock from the memory 120 to the VLD processing unit 140; reference picture transfer processing for DMA transferring reference pictures corresponding to one macroblock from the memory 120 to the to the input buffer 161 of the motion compensation processing unit 160; and decoded video transfer processing for DMA transferring decoded videos corresponding to one macroblock stored in the output buffer 190 to the memory 120.

In FIG. 6, sign "A" expresses a transfer time period of an encoded stream corresponding to one macroblock that is a target of the stream transfer processing. Sign "B" expresses an example of a transfer time period of a different amount of reference pictures that is a target of the reference picture transfer processing in each cycle time corresponding to one macroblock. Sign "C" expresses a transfer time period of a decoded video corresponding to one macroblock that is a target of decoded video transfer processing. Note that the example shown in FIG. 6 corresponds to the example shown in FIG. 5.

In this example, a total amount of DMA transferred reference pictures within the cycle time expressed by TS=(n+2) is more than the predetermined amount, that is, a result of the judgment in the operation of Step S20 shown in FIG. 4 is "YES". Therefore, decoded videos are not DMA transferred within the same cycle time, and decoded videos corresponding to two macroblocks are DMA transferred within a subsequent cycle time expressed by TS=(n+3). In accordance with the MPEG4 AVC standard, the upper limit of the number of motion vectors corresponding to two consecutive macroblocks is determined as 16. Therefore, if an amount of reference pictures transferred within the cycle time expressed by TS=(n+2) is greater, an amount of reference pictures transferred within the cycle time expressed by TS=(n+3) is relatively less or zero. In addition, an amount of a decoded video corresponding to one macroblock against the maximum amount of reference pictures corresponding to one macroblock is sufficiently small.

Therefore, as a result of the operations in Steps S20 to S25 performed by the suppression judgment unit 116 and the decoded video transfer control unit 114, transfer of decoded videos within the cycle time expressed by TS=(n+2) is suppressed. Since the maximum amount of data transferred by accessing to the memory 120 within this cycle time can be reduced, the video decoding device 100 comparatively needs less requirement for a memory bus band width.

Second Embodiment

The following describes a video decoding device 500 according to a second embodiment of the present invention.

The video decoding device 100 according to the first embodiment has the structure for performing DMA transfer of all reference pictures corresponding to one macroblock within each cycle time. Compared with this, the video decoding device 500 according to the second embodiment has a structure in which DMA transfer of all reference pictures corresponding to one macroblock does not necessarily complete within one cycle time, and control is performed such that DMA transfer of all reference pictures corresponding to two consecutive macroblocks completes within two cycle times.

<Structure>

FIG. 7 is a block diagram of the video decoding device 500 according to the second embodiment of the present invention.

As shown in FIG. 7, the video decoding device 500 includes a control unit 510, a memory 120, a DMA controller 130, a VLD processing unit 140, an inverse frequency conversion processing unit 150, a buffer 551, a motion compensation processing unit 560, an intra processing unit 170, a deblocking filter processing unit 180, and an output buffer 590. Note that the video decoding device 100 shown in FIG. 1 and the video decoding device 500 shown in FIG. 7 have the same components to which the same numbers are assigned in FIG. 1 and FIG. 7, and these components are not explained in detail here.

The motion compensation processing unit 560 includes an input buffer 561 having a sufficient capacity for storing all reference pictures corresponding to two consecutive macroblocks. The motion compensation processing unit 560 performs motion compensation processing for reconstructing a video by adding a picture having a quarter-pel accuracy calculated among the reference pictures stored in the input buffer 161 and the difference value of the macroblock output by the inverse frequency conversion processing unit 150.

The output buffer 590 is a buffer memory having a sufficient capacity for storing a decoded video corresponding to one macroblock.

Moreover, the control unit 510 has a hardware structure including a processor, a ROM (Read Only Memory), a timer, etc. The processor operating a program stored in the ROM realizes pipeline control for causing each unit of the video decoding device 100 to perform each processing relating to video decoding processing on a macroblock-by-macroblock basis in parallel in each of a plurality predetermined cycle times. Specifically, the control unit 510 controls the DMA controller 130, the VLD processing unit 140, the inverse frequency conversion processing unit 150, the motion compensation processing unit 560, the intra processing unit 170, and the deblocking filter processing unit 180. Also, the control unit 110 includes, as functional compositional elements, a stream transfer control unit 111, an acquisition unit 112, a reference picture transfer control unit 513, a decoded video transfer control unit 514.

Here, if a macroblock acquired by the acquisition unit 112 is an inter macroblock, the reference picture transfer control unit 513 identifies each position of reference pictures in accordance with each of motion vectors, and instructs the DMA controller 130 to transmit all reference pictures from the memory 120 to the input buffer 561 of the motion compensation processing unit 560 with a specification of each address of the reference pictures. Note that although the reference picture transfer control unit 513 instructs the DMA transfer each at a start time of each cycle time, the DMA transfer does not necessarily start at the start time of the cycle time. However, within two cycle times since DMA transfer of the reference pictures has been instructed, the DMA transfer must complete.

The decoded video transfer control unit 514 instructs the DMA controller 130 to transfer a decoded video corresponding to one macroblock from the output buffer 590 to the memory 120 within one cycle time.

Also, the buffer 551 is a buffer memory that temporarily stores data output by the inverse frequency conversion processing unit 150, and is provided such that the inverse frequency conversion processing unit 150 inverse frequency converts a macroblock in a cycle time, and the motion compensation processing unit 560 or the intra processing unit 170 performs processing on the inverse frequency converted macroblock in a cycle time after a next cycle time.

<Operations>

The following describes the operations for video decoding processing on a macro block-by-macroblock basis performed by the video decoding device 500, in accordance with the flow of control performed by the control unit 510.

The control unit 510 sequentially determines a decoding target macroblock among macroblocks that constitute a compressed video, and performs pipeline control to cause each unit of the video decoding device 500 to sequentially perform processing on any of six or seven macroblocks in each cycle time. Here, processing performed on one macroblock is described.

Figure 8:
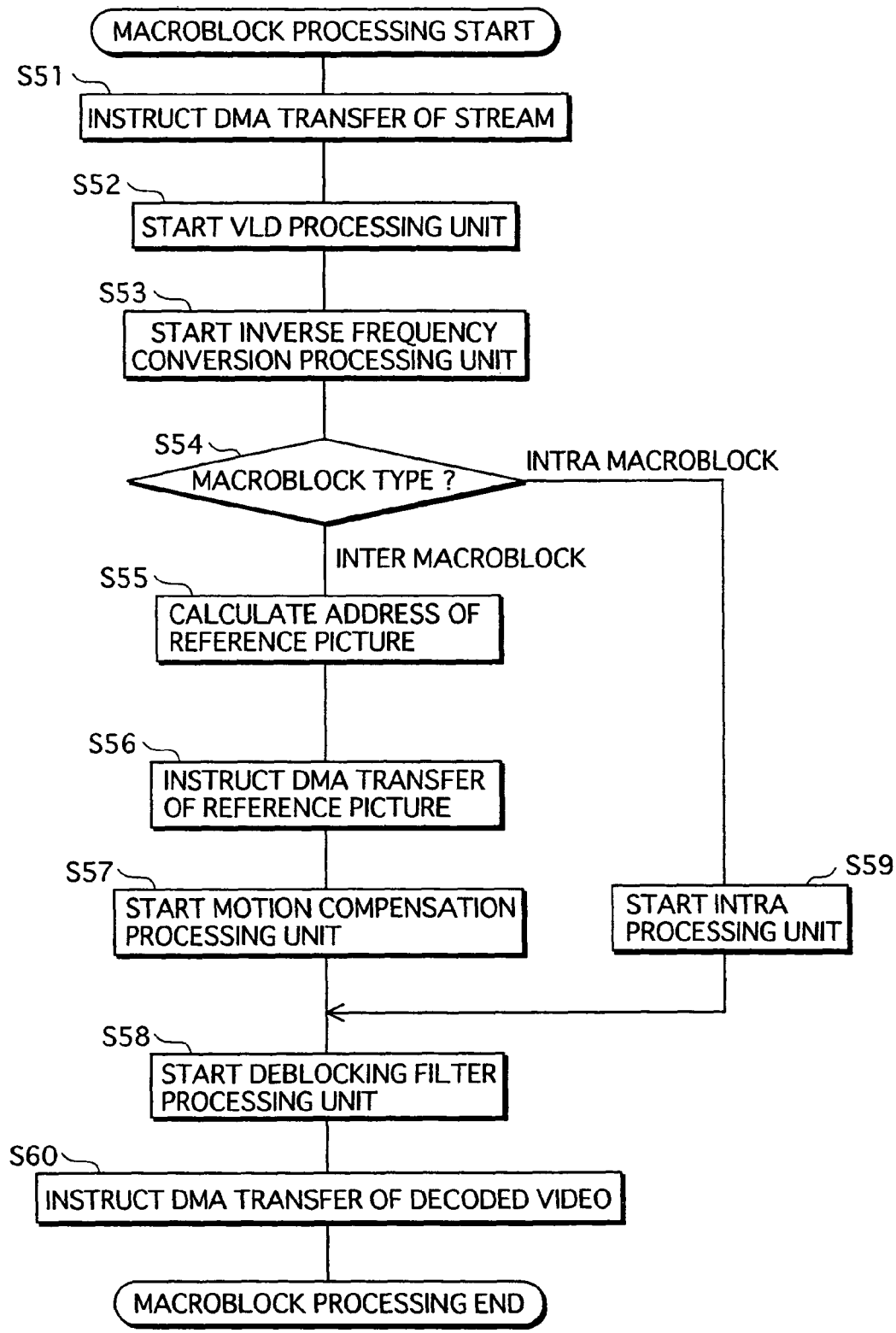
FIG. 8 is a flow chart showing decoding control of a macroblock performed by a control unit 510.

FIG. 8 is a flow chart showing decoding control of a macroblock performed by the control unit 510.

Firstly, the stream transfer control unit 111 of the control unit 510 instructs the DMA controller 130 to transfer an encoded stream from the memory 120 to the VLD processing unit 140 (Step S51). The DMA controller 130 receives the instruction by the cue, and transfers an encoded stream corresponding to one macroblock.

The control unit 510 starts up the VLD processing unit 140 (Step S52). The VLD processing unit 140 extracts motion vectors and a macroblock type from the encoded stream, and transmits the extracted motion vectors and macroblock type to the acquisition unit 112. Also, the VLD processing unit 140 extracts block data from the encoded stream, and transmits the extracted block data to the inverse frequency conversion processing unit 150.

The control unit 510 starts up the inverse frequency conversion processing unit 150 (Step S53). The inverse frequency conversion processing unit 150 inverse frequency converts the block data, and outputs the inverse frequency converted block data.

Regarding a macroblock type of the macroblock, the control unit 510 judges whether the macroblock is an inter macroblock or an intra macroblock (Step S54). If the macroblock is an inter macroblock, the acquisition unit 112 of the control unit 110 transmits the motion vectors to the reference picture transfer control unit 513. Based on a position of the macroblock and the motion vectors, the reference picture transfer control unit 513 calculates each position of reference pictures to calculate each address of the reference pictures in the memory 120 (Step S55). The reference picture transfer control unit 113 instructs the DMA controller 130 to transfer the reference pictures from the memory 120 to the input buffer 561 with specification of the address (Step S56). Then, the reference picture transfer control unit 113 starts up the motion compensation processing unit 560 (Step S57) and starts up the deblocking filter processing unit 180 (Step S58). The DMA controller 130 receives the instruction in Step S16 by the cue, and transfers all of the reference pictures corresponding to the macroblock to the input buffer 561.

Also, based on the reference pictures stored in the input buffer 561 and the inverse frequency converted block data, the motion compensation processing unit 560 reconstructs a video, and transmits the reconstructed video to the deblocking filter processing unit 180. Also, the deblocking filter processing unit 180 suppresses a block noise of the reconstructed video, and stores the reconstructed video in the output buffer 590.

On the other hand, if the macroblock is an intra macroblock in Step S54, the control unit 510 skips the operations in Steps S55 to S57, starts up the intra processing unit 170 (Step S59), and starts up the deblocking filter processing unit 180 (Step S58). The intra processing unit 170 reconstructs a video based on the inverse frequency converted block data, and transmits the reconstructed video to the deblocking filter processing unit 180.

After the operation in Step S58, the decoded video transfer control unit 514 of the control unit 510 instructs the DMA controller 130 to transfer the decoded video corresponding to the macroblock stored in the output buffer 590 to the memory 120 (Step S60).

The processing performed on one macroblock has been described step-by-step, with reference to FIG. 8. Actually, the control unit 510 performs pipeline control, and so the operations shown in each step in the flow chart of FIG. 8 are performed firstly in each cycle time, which is a cyclic time period in the pipeline control. In other words, though a processing target macroblock is different in each step, the following operations may be performed firstly in each cycle time: Step S51, Step S52, Step S53, Steps S55 and S56, Step S57 or Step S59, Step S58, and Step S60. In this case, Step S51, Steps S55 and S56, and Step S60 are performed in a determined order as described later. Other steps may be performed in any order.

Also, the control unit 510 starts up each unit in order to notify the unit of a start of a cycle, and the unit performs processing on basically one macroblock within each cycle time. The DMA controller 130 may not complete DMA transfer of all reference pictures corresponding to one macroblock within one cycle time. The DMA controller 130 must complete DMA transfer of all reference pictures corresponding to two consecutive macroblocks within two cycle times.

FIG. 9 shows an execution sequence of the pipeline control performed by the control unit 510.

In FIG. 9, a time slot TS=n ("n" is any given integer) indicates an n-th cycle time. Moreover, MB #n indicates that an n-th macroblock is a processing target.

As shown in FIG. 9, under the pipeline control performed by the control unit 510, the following processing are performed in parallel: stream transfer processing performed by the DMA controller 130 in accordance with instructions by the stream transfer control unit 111; variable-length decoding processing performed by the VLD processing unit 140;

inverse frequency conversion processing performed by the inverse frequency conversion processing unit 150; reference picture transfer processing performed by the DMA controller 130 in accordance with instructions by the reference picture transfer control unit 513; motion compensation processing performed by the motion compensation processing unit 560 or intra processing performed by the intra processing unit 170; deblocking filter processing performed by the deblocking filter processing unit 180; and decoded video transfer processing performed by the DMA controller 130 in accordance with instructions by the decoded video transfer control unit 514.

Therefore, within a certain cycle time, the above-described units perform processing on six or seven macroblocks in parallel. A length of the cycle time is determined so as to satisfy a speed required for video decoding processing. Each unit needs to perform processing such that a longest time period required for processing on a macroblock-macroblock basis performed by any one among the units is within a time period equivalent to one cycle time.

Concerning the reference picture transfer processing, FIG. 9 simply shows that DMA transfer of reference pictures corresponding to each macroblock is performed within two cycle times. In accordance with the specification of the level for videos having a large size, the upper limit of the total number of motion vectors corresponding to two consecutive macroblocks is determined. Therefore, if decoding such video having a large size, both transfer of reference pictures corresponding to an n-th macroblock and transfer of reference pictures corresponding to an (n+1)-th macroblock completes within two cycle times, for example.

Figure 10:
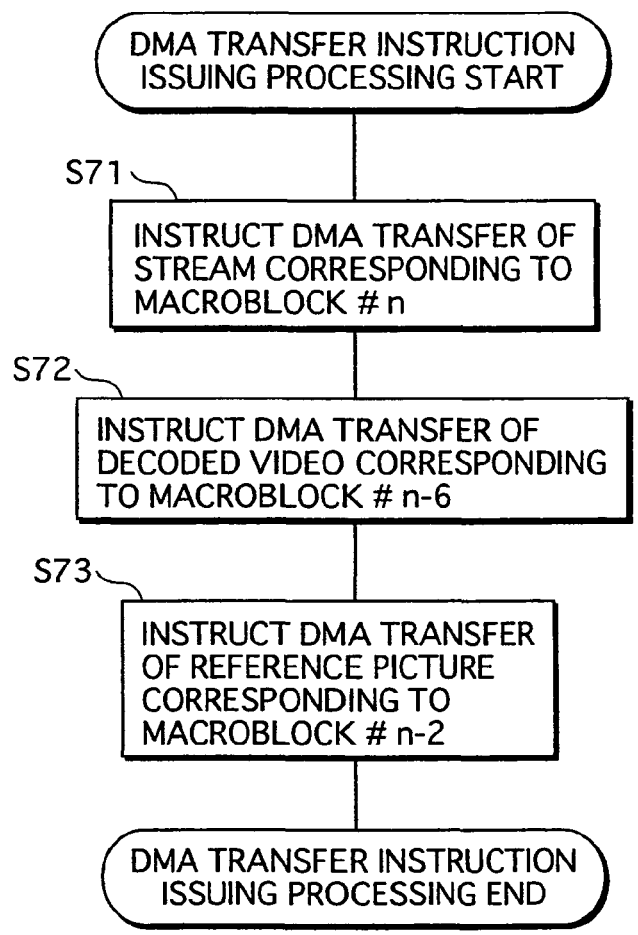
FIG. 10 shows DMA transfer instruction processing performed by the control unit 510.

FIG. 10 shows DMA transfer instruction processing performed by the control unit 510.

At the beginning of each cycle time, the stream transfer control unit 111, the reference picture transfer control unit 513, and the decoded video transfer control unit 514 instructs DMA transfer in a determined order. As shown in FIG. 10, the stream transfer control unit 111 instructs DMA transfer of an encoded stream corresponding to an n-th macroblock (Step S71). Then, the decoded video transfer control unit 514 instructs DMA transfer of a decoded video corresponding to an (n−6)-th macroblock (Step S72). Finally, the reference picture transfer control unit 513 instructs DMA transfer of all reference pictures corresponding to an (n−2)-nd macroblock (Step S73).

Figure 11:
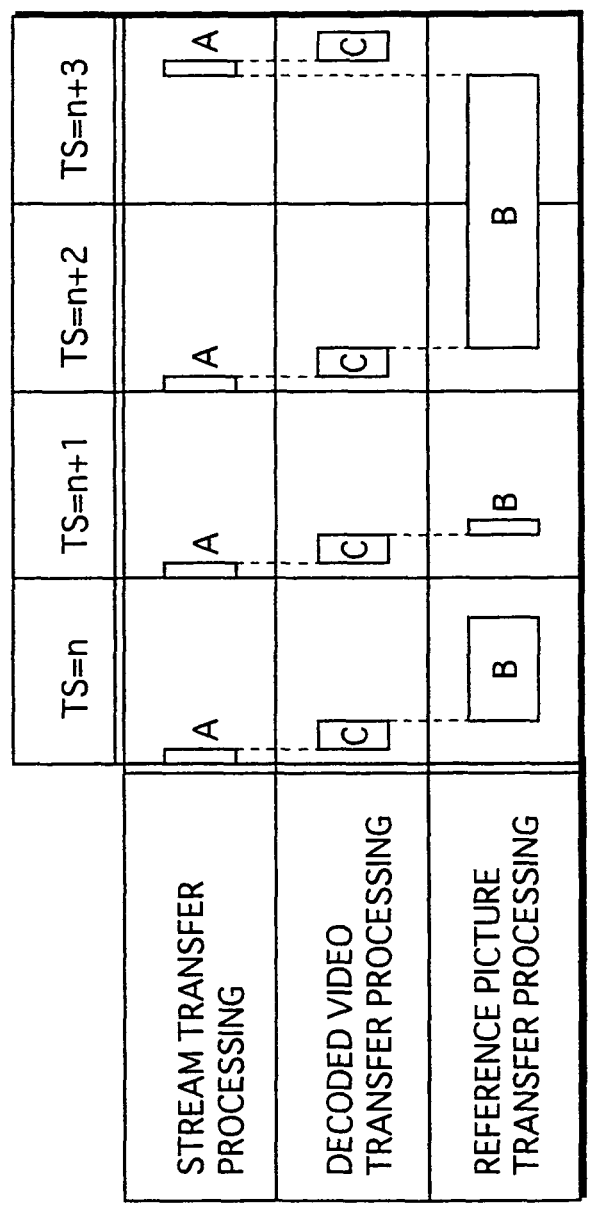
FIG. 11 shows control of DMA transfer in the video decoding device 500.

FIG. 11 shows DMA transfer control in the video decoding device 500.

The DMA controller 130 performs the following time-sharing processing in each cycle time: stream transfer processing for DMA transferring a variable length encoded stream corresponding to one macroblock from the memory 120 to the VLD processing unit 140; reference picture transfer processing for DMA transferring reference pictures corresponding to one macroblock from the memory 120 to the input buffer 561 of the motion compensation processing unit 560; and decoded video transfer processing for DMA transferring a decoded video corresponding to one macroblock to the memory 120.

In FIG. 11, sign "A" expresses a transfer time period of an encoded stream corresponding to one macroblock that is a target of the stream transfer processing. Sign "B" expresses an example of a transfer time period of a different amount of reference pictures that is a target of the reference picture transfer processing in each cycle time corresponding to one macroblock. Sign "C" expresses a transfer time period of a decoded video corresponding to one macroblock that is a target of decoded video transfer processing.

In this example, because of a large total amount of reference pictures corresponding to one macroblock to be DMA transferred within a cycle time expressed by TS=(n+2), the DMA transfer does not complete within the cycle time, and completes within a cycle time expressed by TS=(n+3). DMA transfer is instructed in the order shown in FIG. 10 at the beginning of all cycle times including the cycle time expressed by TS=(n+3) That is, as soon as the DMA transfer completes, the DMA controller 130 acquires a DMA transfer instruction from the cue in an order of receiving instructions.

In accordance with the MPEG4 AVC standard, the upper limit of the total number of motion vectors corresponding to two consecutive macroblocks is determined as 16. Therefore, if an amount of reference pictures transferred within the cycle time expressed by TS=(n+2) is greater, an amount of reference pictures transferred within the cycle time expressed by TS=(n+3) is relatively less or zero.

Therefore, even when DMA transfer of all reference pictures corresponding to one macroblock does not complete within one cycle time, the DMA transfer must complete within two cycle times. Since the maximum amount of data transferred by accessing to the memory 120 within each cycle time can be reduced, the video decoding device 500 comparatively needs less requirement for a memory bus bandwidth.

<Supplementary Description>

Although the video decoding device according to the present invention has been described based on the first and second embodiments, the present invention is not of course limited to these embodiments and include the following modifications.

(1) In the first and second embodiments, the motion compensation processing unit includes therein the input buffer. However, the input buffer may be provided as an exterior unit of the motion compensation processing unit. Also, each unit that constitutes the video decoding device may include therein an input buffer and an output buffer. In addition, each unit may not necessarily be an independent compositional element, and may be structured as a single circuit by assembling a plurality of compositional elements.

(2) In the first and second embodiments, in a cycle time after DMA transfer of all reference pictures corresponding to a macroblock from the memory to the input buffer completes in the reference picture transfer processing, the motion compensation processing unit performs motion compensation processing on the macroblock. However, the following may be employed. As soon as the reference pictures are stored in the input buffer, the motion compensation processing unit starts performing motion compensation processing on the macroblock even if the DMA transfer does not complete. In this case, in a cycle time after the DMA transfer completes for example, the deblocking filter processing unit may perform deblocking filter processing in accordance with a result of the motion compensation processing. In other words, regarding the second embodiment, the video decoding device 500 shown in the second embodiment may be modified so as to realize following. In the case where the motion compensation processing unit starts motion compensation processing as soon as reference pictures are acquired, if DMA transfer of reference pictures corresponding to a macroblock starts within a certain cycle time, deblocking filter processing for the macroblock starts within two cycle times after the certain cycle time.

(3) In the first embodiment, if DMA transfer of reference pictures whose amount is more than the predetermined amount from the memory is performed within one cycle time, DMA transfer of decoded videos to the memory is suppressed in the same cycle time. Instead of this, within the same cycle time in which the DMA transfer of the reference pictures whose amount is more than the predetermined amount is performed, any memory access other than this DMA transfer of the reference pictures may be suppressed. So, for example, DMA transfer of encoded streams from the memory 120 may be suppressed. Suppose that if an amount of data transferred within a cycle time is more than the predetermined amount, an amount of data transferred in a subsequent cycle time is no more than the predetermined amount. The suppressed memory access may be controlled so as to be performed in a cycle time subsequent to the cycle time where the memory access is suppressed, for example. If DMA transfer of encoded streams is to be suppressed, encoded streams corresponding to one macroblock may be read beforehand in addition to the encoded streams shown in FIG. 5 in the first embodiment. Also, an input buffer capable of storing encoded extra streams corresponding to one macroblock may be provided in the VLD processing unit.

(4) Although the threshold value "S" shown in the first embodiment is a smallest integer that satisfies the formula in the first embodiment, the threshold value "S" is not limited to the smallest integer. Note that, the use of the smallest integer can suppress a memory bus band width as much as possible. Also, in the first embodiment, the structure has been described that the video decoding device determines whether to temporarily suppress DMA transfer of decoded videos depending on the result of comparison between the threshold value "S" and the number of motion vectors. Instead of this, the following structure may be employed. The video decoding device determines whether to temporarily suppress DMA transfer of decoded videos depending on a result of comparison between an amount of data of reference pictures that is a DMA transfer target and the predetermined amount.

(5) In the first and second embodiments, the decoding devices that decode videos on a macroblock-by macroblock basis have been described. However, videos may be decoded on a basis of blocks where a macroblock is further partitionized into smaller blocks. The present invention can be applied to video decoding processing by partitionizing a video into blocks having any given size.

Also, the following may be employed. Instead of decoding videos on a macroblock-by-macroblock basis, the pipeline control (see FIG. 9) shown in the second embodiment is performed on a block-by-block basis, and processing on the block-by-block basis is performed basically within one cycle time. The block-by-block basis may include a basis of a block of 4 pixels by 4 pixels macroblock size that is one sixteenth of one macroblock, a basis of a block of 8 pixel by 16 pixel macroblock size that is half of one macroblock. Also, if performing pipeline control on the block-by-block basis, with respect to pipeline stage in the reference picture transfer processing, limitation is not put that transfer of reference pictures corresponding to one block must complete within one cycle time.

Figure 12:
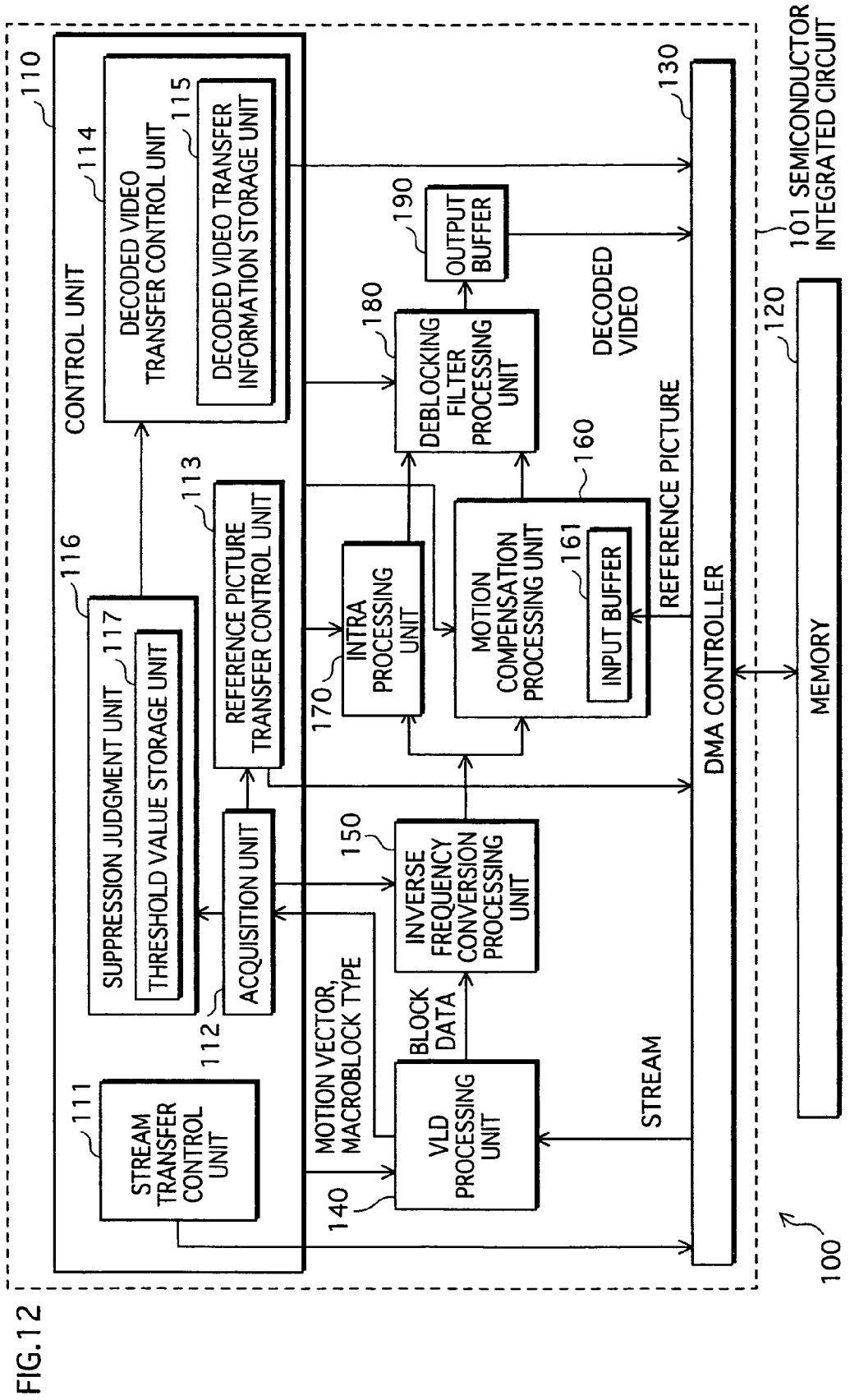
FIG. 12 shows a video decoding device 100 realized as a semiconductor integrated circuit 101 including units except a memory 120.

(6) The video decoding devices 100 and 500 each may be structured on a single semiconductor chip, as a semiconductor integrated circuit. If this semiconductor integrated circuit is a single package, the memory 120 may be provided as an exterior unit of the package. In addition, FIG. 12 shows a video decoding device 100 realized by including units except the memory 120 as a semiconductor integrated circuit 101.

INDUSTRIAL APPLICABILITY

The video decoding device according to the present invention can be used in video reproduction devices that reproduce videos compressed in accordance with the MPEG4 AVC standard, such as DVD players, digital televisions.

The invention claimed is:

1. A video decoding device that performs decoding processing on blocks of a compressed video, the decoding processing including motion compensation processing, the video decoding device comprising:
   a memory that stores reference pictures;
   a compensation unit (i) that includes an input buffer for storing one or more of the reference pictures, the input buffer having a capacity that sufficiently stores reference pictures corresponding to two blocks, and (ii) that sequentially performs the motion compensation processing block by block with reference to the reference pictures stored in the input buffer; and
   a reference picture transfer unit that sequentially transfers reference pictures corresponding to two adjacent blocks from the memory to the input buffer included in the compensation unit such that (i) reference pictures corresponding to a first block from among the two adjacent blocks are transferred during a first two consecutive predetermined time periods and (ii) reference pictures corresponding to a second block from among the two adjacent blocks are transferred during a second two consecutive predetermined time periods,
   wherein the first two consecutive predetermined time periods and the second two consecutive predetermined time periods overlap each other by one predetermined time period.

2. The video decoding device of claim 1, further comprising
   a processing unit operable to perform processing on decoded videos which are motion compensated by the compensation processing unit,
   wherein in parallel with the transfer performed by the reference picture transfer unit, one of the processing unit and the compensation unit performs processing for one block in each of a plurality of time slots, and
   wherein for a block whose transfer starts in a certain time slot, one of the processing unit and the compensation unit starts performing the processing in a time slot after a next time slot of the certain time slot.

3. The video decoding device of claim 2,
   wherein each of the blocks is a macroblock.

4. A video decoding method that performs decoding processing on blocks of a compressed video stored in a memory together with reference pictures, the decoding processing including motion compensation processing, the video decoding method comprising:
   a compensation step for sequentially performing the motion compensation processing block by block with reference to reference pictures stored in an input buffer, wherein (i) the reference pictures stored in the input buffer are one or more of the reference pictures stored in the memory and (ii) the input buffer has a capacity that sufficiently stores reference pictures corresponding to two blocks; and
   a reference picture transferring step for sequentially transferring reference pictures corresponding to two adjacent blocks from the memory to the input buffer utilized by the compensation step such that (i) reference pictures corresponding to a first block from among the two adjacent blocks are transferred during a first two consecutive predetermined time periods and (ii) reference pictures corresponding to a second block from among the two adjacent blocks are transferred during a second two consecutive predetermined time periods, wherein the first two consecutive predetermined time periods and the second two consecutive predetermined time periods overlap each other by one predetermined time period.

5. A semiconductor integrated circuit that performs decoding processing on blocks of a compressed video, the decoding processing including motion compensation processing, the semiconductor integrated circuit comprising:

a memory that stores reference pictures;

a compensation circuit unit (i) that includes an input buffer for storing one or more of the reference pictures, the input buffer having a capacity that sufficiently stores reference pictures corresponding to two blocks, and (ii) that sequentially performs the motion compensation processing block by block with reference to the reference pictures stored in the input buffer; and a reference picture transfer circuit unit that sequentially transfers reference pictures corresponding to two adjacent blocks from the memory to the input buffer included in the compensation circuit unit such that (i) reference pictures corresponding to a first block from among the two adjacent blocks are transferred during a first two consecutive predetermined time periods and (ii) reference pictures corresponding to a second block from among the two adjacent blocks are transferred during a second two consecutive predetermined time periods, wherein the first two consecutive predetermined time periods and the second two consecutive predetermined time periods overlap each other by one predetermined time period.

* * * * *